(No Model.)
T. RYAN.
FRICTION CLUTCH.
No. 299,938. Patented June 3, 1884.
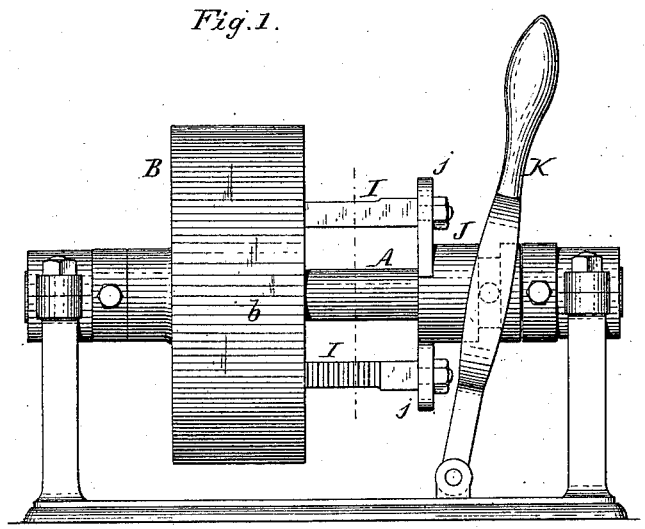
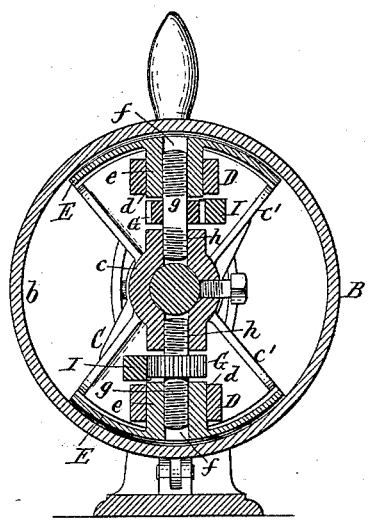
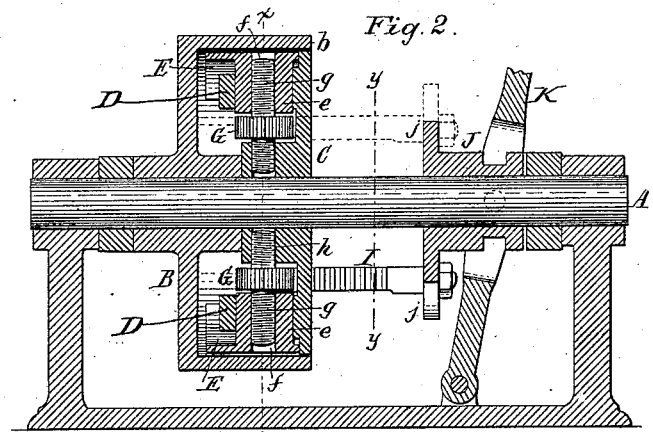
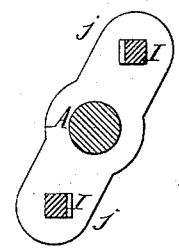
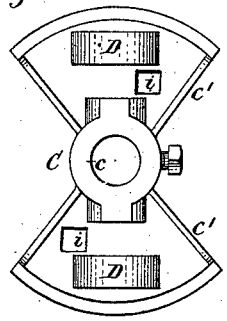
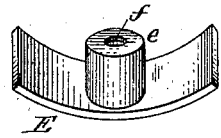
Witnesses: Chas. J. Buchheit, Theo. L. Popp
Thomas Ryan, Inventor.
By Wilhelm Bonner, Attorneys.

UNITED STATES PATENT OFFICE.

THOMAS RYAN, OF LOCKPORT, NEW YORK, ASSIGNOR OF ONE-HALF TO WILLIAM McLEAN, OF SAME PLACE.

FRICTION-CLUTCH.

SPECIFICATION forming part of Letters Patent No. 299,938, dated June 3, 1884.

Application filed March 11, 1884. (No model.)

*To all whom it may concern:*

Be it known that I, THOMAS RYAN, of Lockport, in the county of Niagara and State of New York, have invented new and useful Improvements in Friction-Clutches, of which the following is a specification.

This invention relates to improvements in that class of friction clutches or couplings which are provided with friction-segments whereby the coupling is effected, the segments being pressed against the inner rim of the pulley by suitable mechanism.

The object of my invention is to simplify the construction of the mechanism whereby the friction-segments are operated, and to render the same more reliable in its operation.

My invention consists, to that end, in the improvements which will be hereinafter fully described, and pointed out in the claim.

In the accompanying drawings, Figure 1 represents a side elevation of a friction-clutch coupling provided with my improvements. Fig. 2 is a longitudinal section thereof. Fig. 3 is a vertical cross-section in line $x\,x$, Fig. 2. Fig. 4 is a cross-section in line $y\,y$, Fig. 2. Fig. 5 is an elevation of the clutch-head. Fig. 6 is a perspective view of one of the friction-segments.

Like letters of reference refer to like parts in the several figures.

A represents a horizontal shaft journaled in suitable bearings, and B a pulley mounted loosely on said shaft.

C represents the clutch-head, which is secured to the shaft A so as to revolve therewith. The clutch-head C consists of a hub, $c$, and two sector-shaped wings, $c'\,c'$, which project from the hub $c$ on opposite sides thereof. The outer edges of the wings $c'$ extend nearly to the inner side of the rim $b$ of the pulley, so that the wings can revolve within the same without coming in contact therewith.

D is a guide lug or socket formed on the inner side of each wing $c'$, and provided with a cylindrical opening, $d$.

E E are the friction-segments, arranged within the rim $b$ of the pulley B, on diametrically-opposite sides of the shaft, and each provided on its inner side with a cylindrical stem or guide, $e$, which is fitted in the opening $d$ of the lug D, so as to slide therein radially toward or from the rim $b$. The segments E are fitted closely against the inner sides of the wings $c'$, whereby the segments are prevented from turning in the sockets D. The stems $e$ are provided with radial bores or openings $f$, which are furnished with internal screw-threads.

$g\,g$ represent the actuating-screws, whereby the segments E are operated. Each of these screws is provided with a right and left hand screw-thread, and carries a gear-wheel, G, between the two threads. The outer thread engages in the threaded opening $f$ of the segment E, and the inner thread engages in an internally-threaded opening, $h$, formed in the hub $c$, so that by turning the screw in one or the other direction the segment is moved toward or from the rim $b$. The screws $g\,g$ are arranged on diametrically-opposite sides of the hub, to engage with the segments E.

I I are two horizontal rack-bars, which engage with the gear-wheels G, so that by moving the rack-bars forwardly or backwardly the wheels G and the screws $g$ are turned, thereby moving the segments E toward or from the rim $b$. The rack-bars are guided in openings $i$, formed in the wings $c'$, and are attached at their outer ends to the ears $j$ of a shifting sleeve, J. The latter is mounted loosely on the shaft A, and capable of lengthwise movement on the same.

K represents the shifting lever, which is pivoted to any suitable stationary support, and which embraces the sleeve J, and is provided with pins projecting into an annular groove in the sleeve J in a well-known manner, so that by shifting the lever K the sleeve can be moved lengthwise on the shaft.

When the parts are in the position represented in Figs. 1, 2, and 3, the rack-bars are in their outermost position, and the segments E are removed from the rim $b$ of the pulley, so that the rotary movement of the shaft A is not communicated to the pulley. By moving the lever K toward the left in Fig. 1, the gear-wheels G and the screws $g$ are turned in the direction in which they will cause the segments E to move toward the rim $b$, and this movement of the parts is continued until the segments E are firmly pressed against the pulley, when the friction between the segments and the pulley will cause the latter to turn with the shaft A. The right and left hand screw-threads on the actuating-screws $g$ produce a rapid linear movement of the segments E; but one of these screw-threads may be omitted, if desired, and the screw-bolt be attached to the adjacent part—either the hub or the segment—by a pin and annular groove, so that the bolt can turn in the part while being held against movement in the direction of its length.

The herein-described mechanism for actuating the screws $g$ is very simple and reliable, and serves to hold the segments E firmly in the desired position.

I claim as my invention—

The combination, with the pulley B, of the clutch-head C, having guide-lugs D, segments E, provided with stems $e$, sliding in the lugs D, adjusting-screws $g$, extending from the hub $c$ of the clutch-head to the segments E, gear-wheels G, secured to the screws $g$ between the hub $c$ and the lugs D, rack-bars I, meshing with the wheels G, and a movable sleeve, J, to which the rack-bars are attached, substantially as set forth.

Witness my hand this 7th day of March, 1884.

THOMAS RYAN.

Witnesses:
WILLIAM FLECKSER,
FRANK FARNELL.